United States Patent
Krauss et al.

(10) Patent No.: US 11,465,857 B2
(45) Date of Patent: Oct. 11, 2022

(54) CAMFEEDER AND A METHOD OF USING THE CAMFEEDER TO SIMULTANEOUSLY MOVE A HEAVY ELONGATED OBJECT IN A TRANSVERSE DIRECTION AND ACCELERATE THE OBJECT IN A LINEAL DIRECTION

(71) Applicant: WE KNOW HOW HOLDINGS, LLC, Hot Springs, AR (US)

(72) Inventors: Josh Krauss, Hot Springs, AR (US); Andy Raybon, Hot Springs, AR (US)

(73) Assignee: WE KNOW HOW HOLDINGS, LLC, Hot Springs, AR (US)

( * ) Notice: Subject to any disclaimer, the term of this patent is extended or adjusted under 35 U.S.C. 154(b) by 0 days.

(21) Appl. No.: 17/242,427

(22) Filed: Apr. 28, 2021

(65) Prior Publication Data
US 2021/0347582 A1    Nov. 11, 2021

Related U.S. Application Data

(60) Provisional application No. 63/020,050, filed on May 5, 2020.

(51) Int. Cl.
*B65G 47/82* (2006.01)
*B65G 39/10* (2006.01)

(52) U.S. Cl.
CPC ............. *B65G 47/82* (2013.01); *B65G 39/10* (2013.01); *B65G 2201/0217* (2013.01)

(58) Field of Classification Search
CPC ............. B65G 47/82; B65G 39/10; B65G 2201/0217; B65G 47/53; B65G 33/02; B65G 33/06; B65G 2201/0282
See application file for complete search history.

(56) References Cited

U.S. PATENT DOCUMENTS

| 3,443,676 A * | 5/1969 | Bilocq | B65G 47/82 198/597 |
| 4,431,367 A * | 2/1984 | Pousette | B65G 47/53 198/463.6 |
| 9,387,988 B2 | 7/2016 | Saastamo | |
| 2002/0060135 A1 | 5/2002 | Lindeblatt | |
| 2014/0209436 A1* | 7/2014 | Saastamo | B65G 13/06 198/604 |

FOREIGN PATENT DOCUMENTS

EP    2039631    4/2008

OTHER PUBLICATIONS

Springer Acceleration Rolls (0:37-0:44) https://www.youtube.com/watch?v=cjkgvEeIcAo (Year: 2018).*

(Continued)

*Primary Examiner* — Mark A Deuble
(74) *Attorney, Agent, or Firm* — Jeffrey S. Melcher; Melcher Patent Law PLLC (57) ABSTRACT

A camfeeder system that uses an eccentric disk kicker having a friction surface that contacts surface of a heavy elongated object to smoothly and simultaneously move the elongated object in a transverse direction towards a conveyor and accelerate the elongated object in a lineal direction the conveyor travels. A method of changing a direction a heavy elongated object travels from transverse to lineal using the camfeeder system.

27 Claims, 12 Drawing Sheets

(56) References Cited

OTHER PUBLICATIONS

Springer Acceleration Rolls (0:27-0:30) https://www.youtube.com/watch?v=cjkgvEeIcAo (Year: 2018).*
Springer Acceleration Rolls (0:07-0:29 and 0:36-0:42) https://www.youtube.com/watch?v=ybvzvsfO52M.
Springer Acceleration Rolls (1:22-1:26) https://www.youtube.com/watch?v=tNfMyYaGBas.
Eccentric Disk Kicker (0:28-0:32) https://www.youtube.com/watch?v=cnFVw4WHk20.
Eccentric Disk Kicker (0:20-0:25 and 1:02-1:06) https://www.youtube.com/watch?v=tNfMyYaGBas.

* cited by examiner

CAMFEEDER AND A METHOD OF USING THE CAMFEEDER TO SIMULTANEOUSLY MOVE A HEAVY ELONGATED OBJECT IN A TRANSVERSE DIRECTION AND ACCELERATE THE OBJECT IN A LINEAL DIRECTION

FIELD OF THE INVENTION

The invention relates to an improved camfeeder system that smoothly and simultaneously moves a heavy elongated object, such as a log, in a transverse direction and accelerates the heavy elongated object in a lineal direction without a need for complex motion control. The invention further relates to a method of changing the direction the elongated object is moving from a transverse direction to a lineal direction using the camfeeder system.

BACKGROUND OF THE INVENTION

Eccentric disk kickers have been used to transition a log from a lineal direction on a conveyor to a transverse direction on a screw drive, in which the flow direction of the conveyor is substantially perpendicular to the flow direction of the screw drive. The eccentric disk kicker has a disk that is mounted off-center of a shaft like a cam. When the eccentric disk kicker is rotated, a side of the disk moves the log in a transverse direction from the conveyor to the screw drive. The side surface of the disk is low friction and may contain incline or pocket to avoid imparting acceleration to the log in the lineal direction.

European Patent Application No. 2039631 (Pichler) discloses an existing solution for changing the direction of a log being conveyed using screw rolls/fluted rolls with a high friction surface on the outfeed end. The problem with this method is that the acceleration is too sudden, which makes the log slip unpredictably or requires complex motion control from the drive.

U.S. Pat. No. 9,387,988 (Saastamo) discloses an apparatus for changing the direction of the logs using tapered feed rolls. U.S. patent application publication No. 2002/0060135 (Lindeblatt) discloses a spiral singulator for the changing the direction of logs.

Figure 1A:
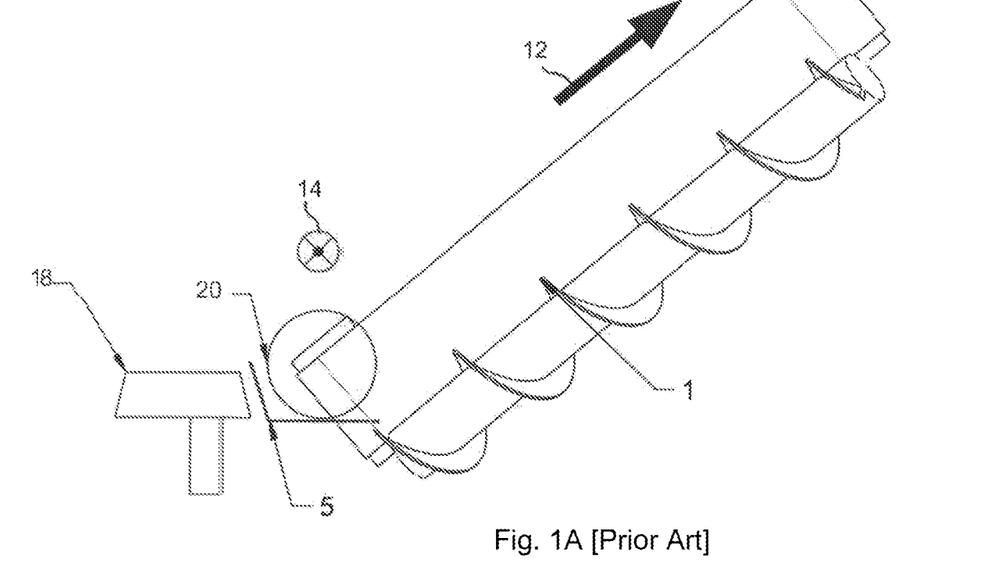
FIG. 1A [Prior Art] illustrates a conventional eccentric disk kicker used to move a log in a transverse direction off of a conveyor and onto a transverse screw drive.

The following videos available on YouTube disclose the use of conventional eccentric disk kickers 18 as shown in FIG. 1A [Prior Art]: Springer Acceleration Rolls (0:07-0:29 and 0:36-0:42) https://www.youtube.com/watch?v=ybvzvsfO52M; Springer Acceleration Rolls (0:37-0:44) https://www.youtube.com/watch?v=cjkgvEelcAo; Springer Acceleration Rolls (1:22-1:26) https://www.youtube.com/watch?v=tNfMyYaGBas; Eccentric Disk Kicker (0:28-0:32) https://www.youtube.com/watch?v=cnFVw4WHk20; Eccentric Disk Kicker (0:27-0:30) https://www.youtube.com/watch?v=cjkgvEelcAo; and Eccentric Disk Kicker (0:20-0:25 and 1:02-1:06) https://www.youtube.com/watch?v=tNfMyYaGBas.

In FIG. 1A [Prior Art], a log 20 travelling in a lineal direction 14 on the conveyor 5 is moved in a transverse direction onto a plurality of screws 1 by the use of the disk kicker 18. Acceleration of the log in the lineal direction 14 by the disk kicker 18 is undesired and is avoided by using a low friction surface on the disk kicker 18. The low friction surface ensures that when the disk kicker 18 is rotated the disk kicker 18 pushes the log 20 from the conveyor 15 to the screws 1 in only the transverse direction 12 without imparting acceleration to the log 20 in the lineal direction 14.

Prior art methods of changing the direction a log is moving from a transverse direction to a lineal direction on a conveyor have problems with abrupt acceleration when the log is moved onto the conveyor. Logs are large and heavy, such as 10 feet or more in length and weighing a 1,000 pounds or more. The abrupt acceleration of a heavy log can cause wear and damage to the conveyor over time.

SUMMARY OF THE INVENTION

The present invention solves the problems of the prior art by providing an unexpectedly and surprisingly smooth lineal acceleration of a log in the direction the conveyor is travelling at the same time the log is being moved transversely onto the conveyor in a sinusoidal motion.

The objects of the invention and other objects can be obtained by a camfeeder system for changing a direction an elongated object is being transported from a transverse direction to a lineal direction comprising:
 a conveyor configured for conveying the elongated object in the lineal direction, the elongated object having a short axis and a long axis, the long axis being aligned with the lineal direction and the short axis being aligned with the transverse direction; and
 a disk kicker being configured to rotate about an off-center shaft, the disk kicker having a friction surface configured to contact a surface of the elongated object, and during rotation the disk kicker simultaneously accelerates the elongated object in the lineal direction the conveyor moves and moves the elongated object in the transverse direction onto the conveyor.

The objectives can also be obtained by a method of changing a direction an elongated object is travelling from a transverse direction to a lineal direction comprising:
 moving the elongated object in a transverse direction to a pocket, the elongated object having a short axis and a long axis, the long axis being aligned with the lineal direction and the short axis being aligned with the transverse direction, and the pocket being configured so that gravity biases a surface of the elongated object against a friction surface of a disk kicker;
 depositing the elongated object in the pocket so that a surface of the log is biased against the friction surface;
 rotating the disk kicker so that the friction surface contacts the surface of the elongated object to simultaneously accelerate the elongated object in the lineal direction and move the elongated object in the transverse direction onto a conveyor, and the disk kicker being mounted on an associated off-center shaft; and
 conveying the elongated object in the lineal direction on the conveyor.

The objectives of the invention can be further obtained by a method of changing a direction a log is travelling from a transverse direction to a lineal direction comprising:
 moving the log in a transverse direction to a pocket, the log having a short axis and a long axis, the long axis being aligned with the lineal direction and the short axis being aligned with the transverse direction, and the pocket being configured so that gravity biases a surface of the log against a friction surface of a disk kicker;
 depositing the log in the pocket so that a surface of the log is biased against the friction surface;
 rotating the disk kicker so that the friction surface contacts the surface of the log to simultaneously accelerate the log in the lineal direction and move the log in the transverse direction onto a conveyor, and the disk kicker being mounted on an associated off-center shaft; and conveying the log in the lineal direction on the conveyor.

DETAILED DESCRIPTION OF THE INVENTION

The invention will be described with reference to the attached non-limiting drawings.

Figure 1B:
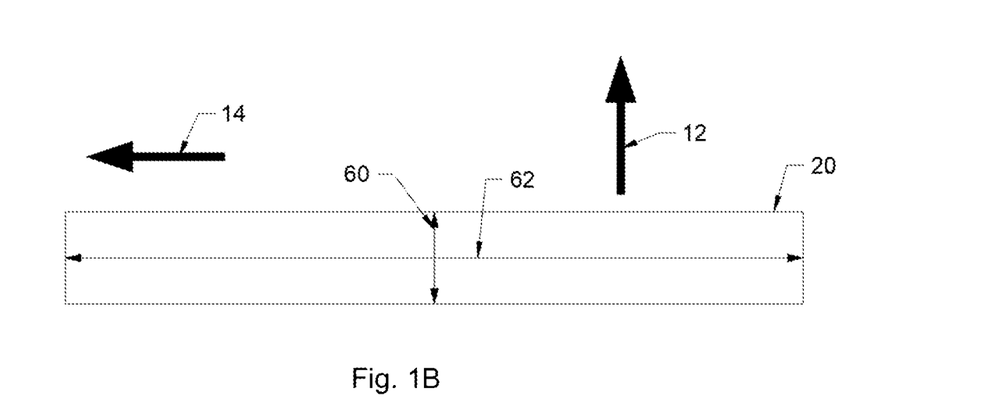
FIG. 1B illustrates a heavy elongated object, a log, having a short axis and a long axis.
Figure 17:
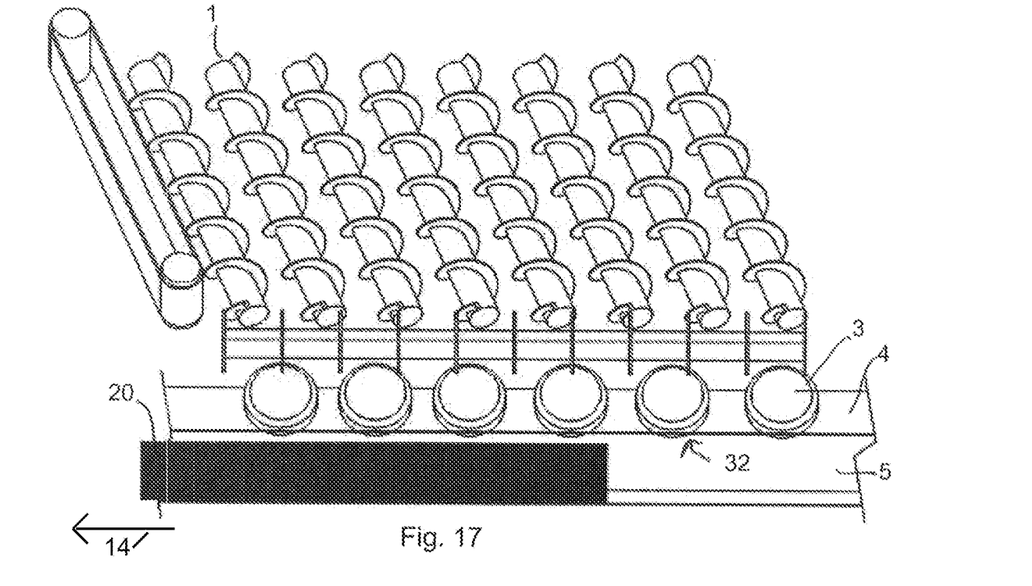
FIG. 17 illustrates a top view of the camfeeder system in which the high friction, eccentric disk kickers have rotated into the extended position and the log has been pushed in a transverse direction onto the conveyor and accelerated in a lineal direction the conveyor moves by the high friction surface of the disk kickers.
Figure 18:
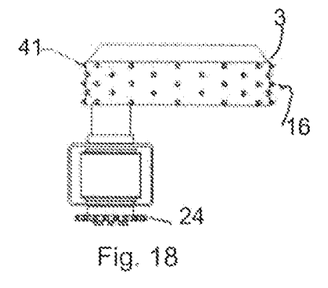
FIG. 18 illustrates a high friction, eccentric disk kicker having spikes on the high friction surface.
Figure 19:
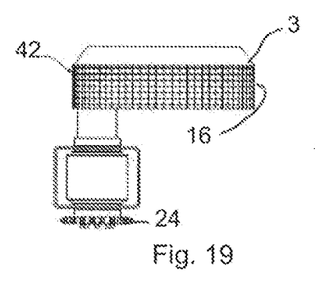
FIG. 19 illustrates a high friction, eccentric disk kicker having knurled on the high friction surface.
Figure 20:
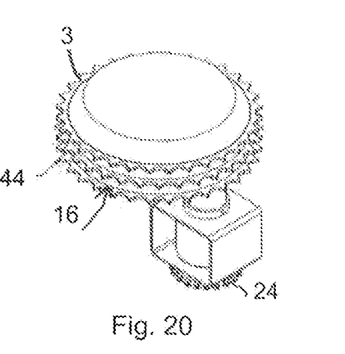
FIG. 20 illustrates a high friction, eccentric disk kicker having staggered teeth on the high friction surface.
Figure 21:
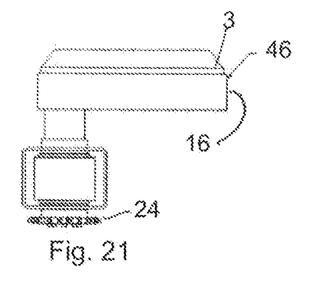
FIG. 21 illustrates a high friction, eccentric disk kicker having rubber coating on the high friction surface.
Figure 22:
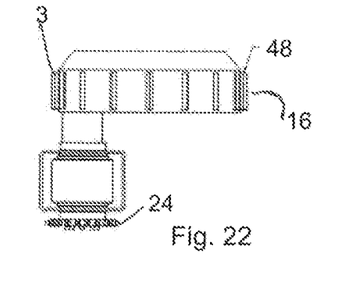
FIG. 22 illustrates a high friction, eccentric disk kicker having projections on the high friction surface.

As shown in FIG. 1B, the log 20 is a heavy elongated object having a short axis 60 along a diameter of the log 20 and a long axis 62 that extends the length of the log 20 through the center of the log 20. Moving a log 20 in in the transverse direction 12 means the short axis 60 of the log 20 is aligned with the direction the log 20 is travelling, as shown by the log 20 travelling in a transverse direction 12 while laying across the screws 1 in FIG. 3. Moving a log 20 in the lineal direction 14 means that the long axis 62 of the log 20 is aligned with the direction the log 20 is travelling, as shown by the log 20 travelling in a lineal direction 14 on the conveyor 5 as shown in FIG. 17.

Figure 2:
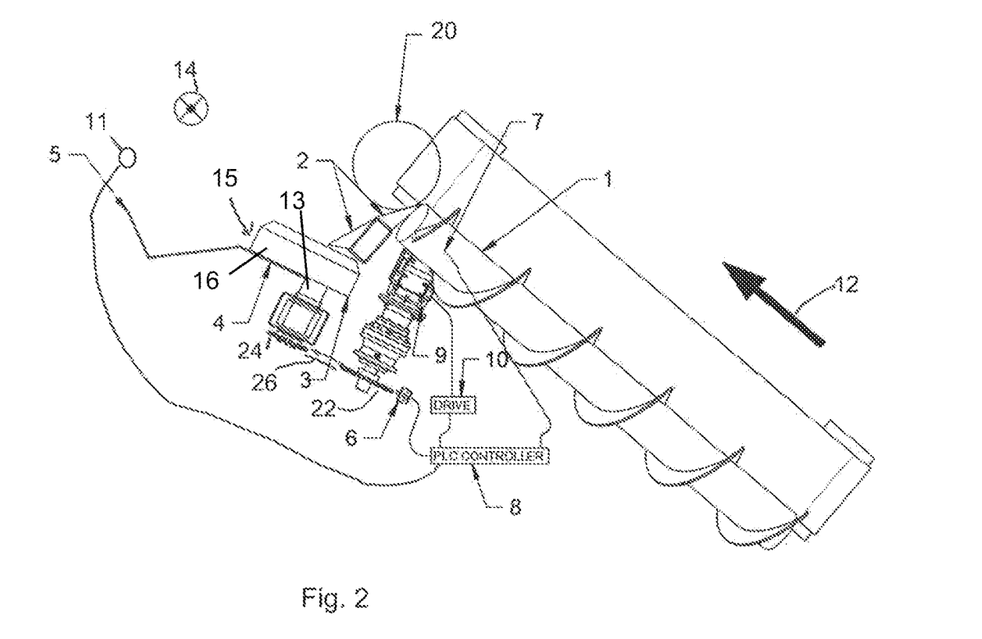
FIG. 2 illustrates a high friction disk kicker configured to move a log in a transverse direction and accelerate the log in a lineal direction onto a conveyor.
Figure 3:
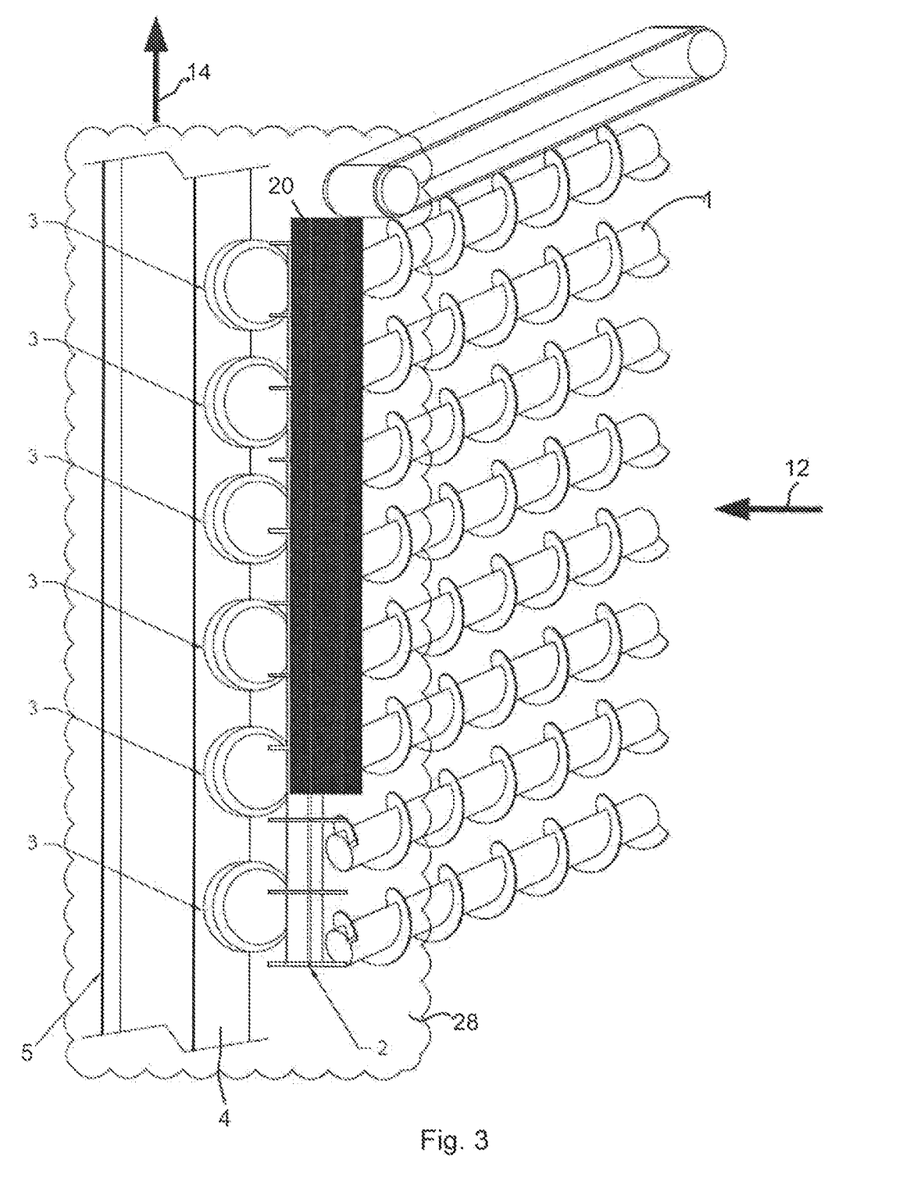
FIG. 3 illustrates a view of the camfeeder system having a plurality of screws and a log moved in a transverse direction to the end of the screws.
Figure 6:
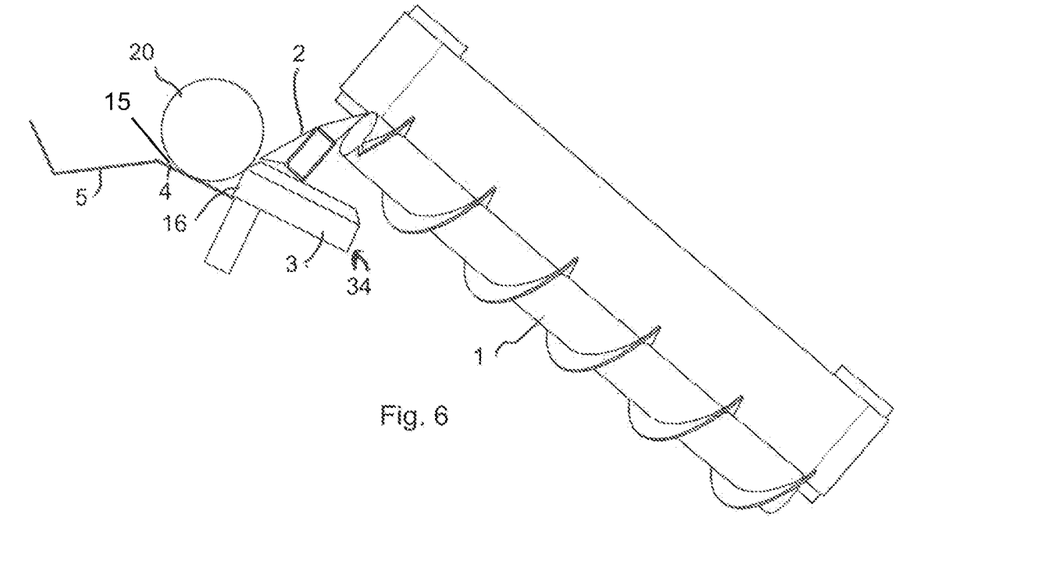
FIG. 6 illustrates the disk kicker in a retracted position.

FIGS. 2 and 3 illustrate a preferred example of the camfeeder system. A plurality of rotating screws 1 move the log 20 in the transverse direction 12 and at the end the screws 1 the log 20 contacts a log slide 2. At the bottom of the log slide 2 there is located a plurality of high friction, eccentric disk kickers 3, each mounted on an associated off-center shaft 13 on which a disk sprocket 24 mounted. An AC motor 9 has a motor sprocket 22. The motor sprocket 22 can be connected to the disk sprocket 24 by a chain so that the motor 9 can rotate the disk kickers 3. Each disk kicker 3 has a friction surface 16 for contact with a surface of the log 20. A pocket 15 is defined by a pocket slide 4 and the friction surface 16. When the disk kicker 3 is in a retracted position 34, the log can slide down the log slide 2 and fall into the pocket 15 as shown in FIG. 6. A conveyor 5 is provided at the end of the screws 1. The novel aspect of the present invention is identified by the cloud 28.

A PLC controller 8 can be used to control the operation of the camfeeder system. A suitable commercial example of the PLC controller 8 is an Allen-Bradley ControlLogix 5570 controller. While it is common for industrial machinery to be controlled by PLC controllers 8, the computer controller could instead be designed to make use of commodity computer hardware that utilizes other software languages and paradigms, such as C, C#, Fortran, Python, etc.

To control and determine the location of the disk kicker 3, a proximity sensor 6, such as Allen-Bradley 871C-D14AP30-E2, combined with a toothed wheel (sprocket 22) can be used. An encoder 7 (e.g. BEI HS35) can be used to determine the location and control the screws 1. The motion of the disk kickers 3 and screws 1 can be controlled using both a proximity sensor 6 and encoder 7 connected to the PLC controller 8 to provide position feedback to the PLC controller 8, which controls the motor 9 via the motor's AC drive 10. However, while a digital feedback system will improve performance, it is not necessary for operation. Thus, the proximity sensor 6, encoder 7, and PLC computer controller 8 are not essential. These devices could be replaced by a physical relay circuit.

The lineal outfeed conveyor 5 must be clear before the next log 20 can be fed to the conveyor 5. At least one sensor 14 connected to the PLC controller 8 can be used for determining the location of the log 20 on the conveyor 5, in the pocket 15, on top of the disk kicker 3, and/or at the end of the screws 1 to ensure the conveyor 5 is clear before the next log 20 is fed to the conveyor 5. An example of a preferred sensor 14 is a machine vision camera system (e.g. Cognex DataMan 374). The machine vision camera system can be used to determine both to verify a log 20 is present in the pocket 15 as well as to detect when the previous log 20 in the lineal outfeed conveyor 5 has left the loading area. The machine vision camera can be used to reduce the spacing between logs 20 on the conveyor 5. Other examples of the sensor 6 include photocells (Banner QS30LV), lasers (Allen-Bradley 871C-D14AP30-E2), ultrasonic (871C-D14AP30-E2), radar (Banner QT50R-KR-AFHQ), absolute encoders (Electrocam PS 4256-11-DDR), incremental encoders (BEI HS35), and magnetic sensors (Allen-Bradley 871C-D14AP30-E2).

The motors and controls for controlling conventional eccentric disk kicker's 18 can be used in the present invention to drive and control the high friction eccentric disk kicker 3. The motor 9 can be AC, DC, hydraulic, or pneumatic powered, as desired. A commercial example of suitable AC motor is a Baldor IDNM3665T and a suitable AC drive is an Allen-Bradley Kinetix 5700.

FIGS. 18-22 illustrate different examples of suitable friction surfaces 16, including but not limited to, spikes 41, knurled surface 42, staggered teeth 44, a rubber coating 48, or projections 48.

Figure 4:
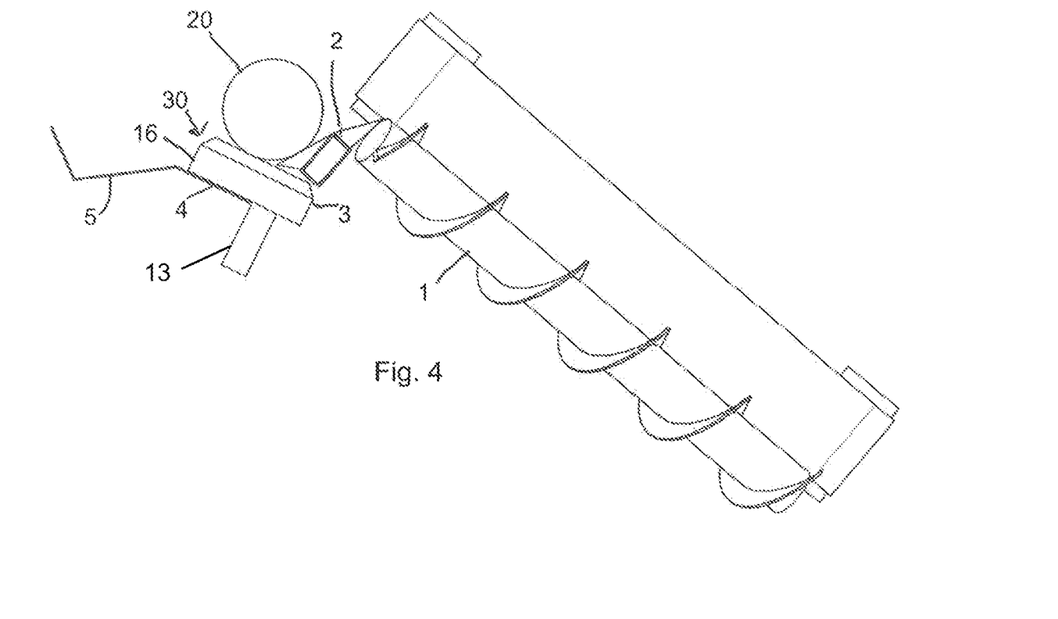
FIG. 4 illustrates a side view of the camfeeder system in which the log slid down the log slide in a transverse direction onto the top of extended high friction, eccentric disk kickers.
Figure 5:
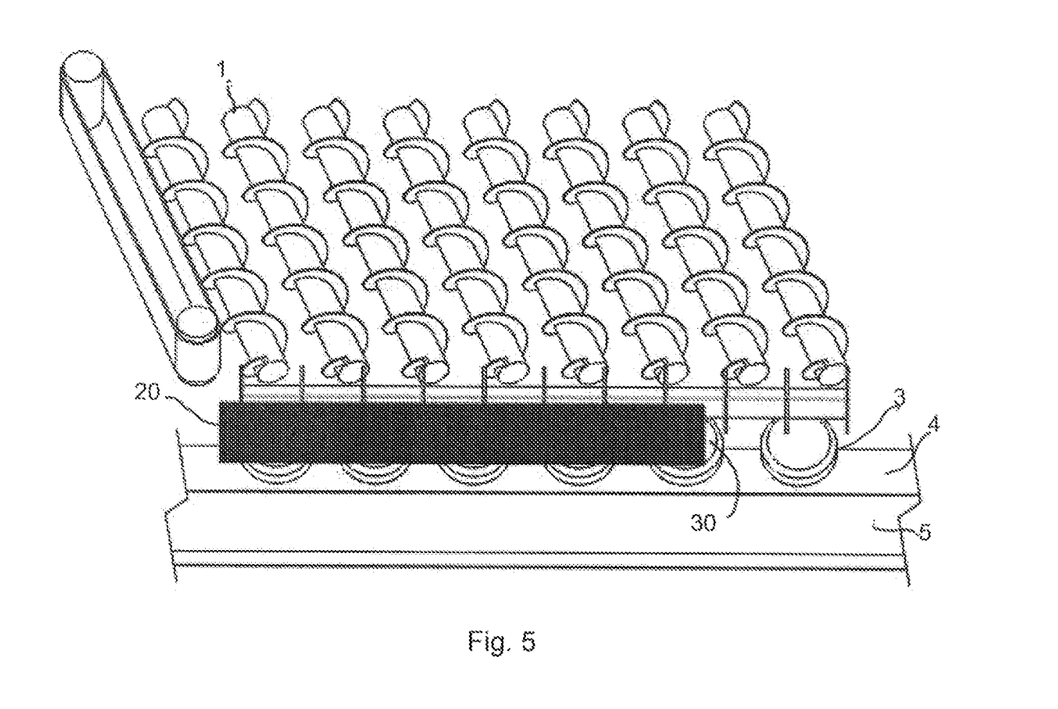
FIG. 5 illustrates a top view of the camfeeder system in which the log slid down the log slide in a transverse direction onto the top of extended high friction, eccentric disk kickers.
Figure 7:
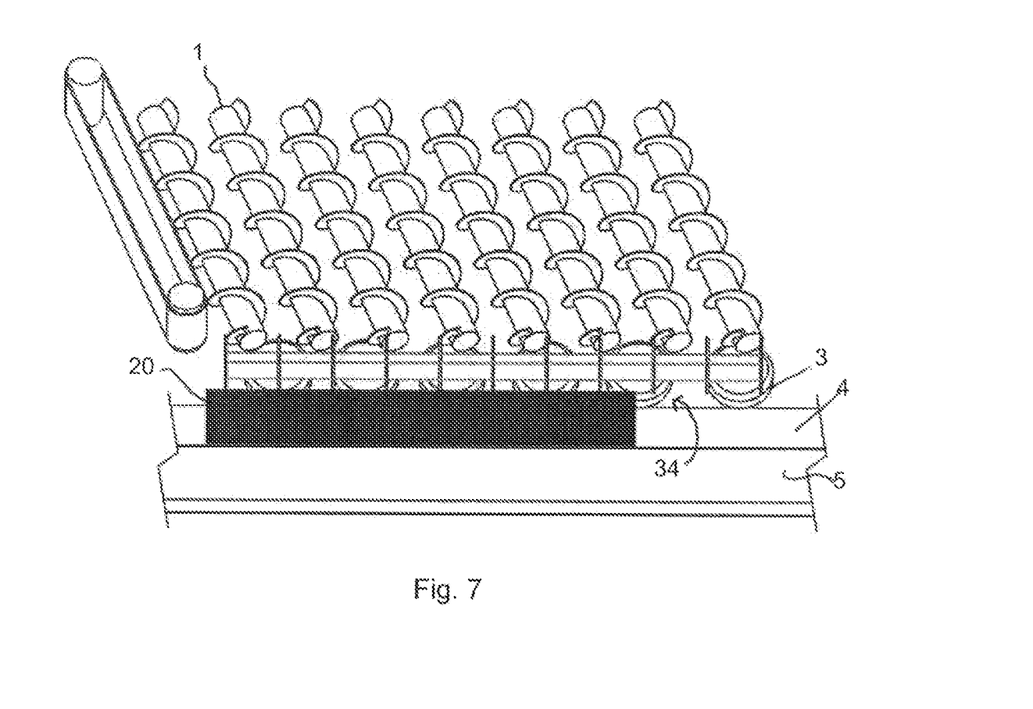
FIG. 7 illustrates a top view of the camfeeder system in which the high friction, eccentric disk kickers are rotated into a retracted position and the log has fallen into a pocket defined by a pocket slide and the high friction surface of the disk kickers.
Figure 8:
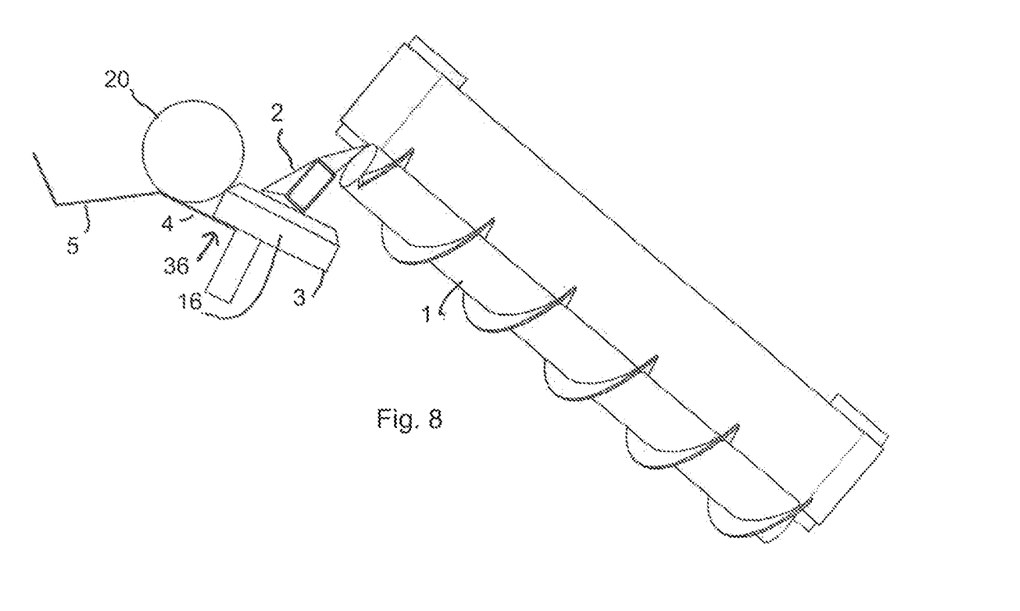
FIG. 8 illustrates the disk kicker rotated to a partially extended first position.
Figure 9:
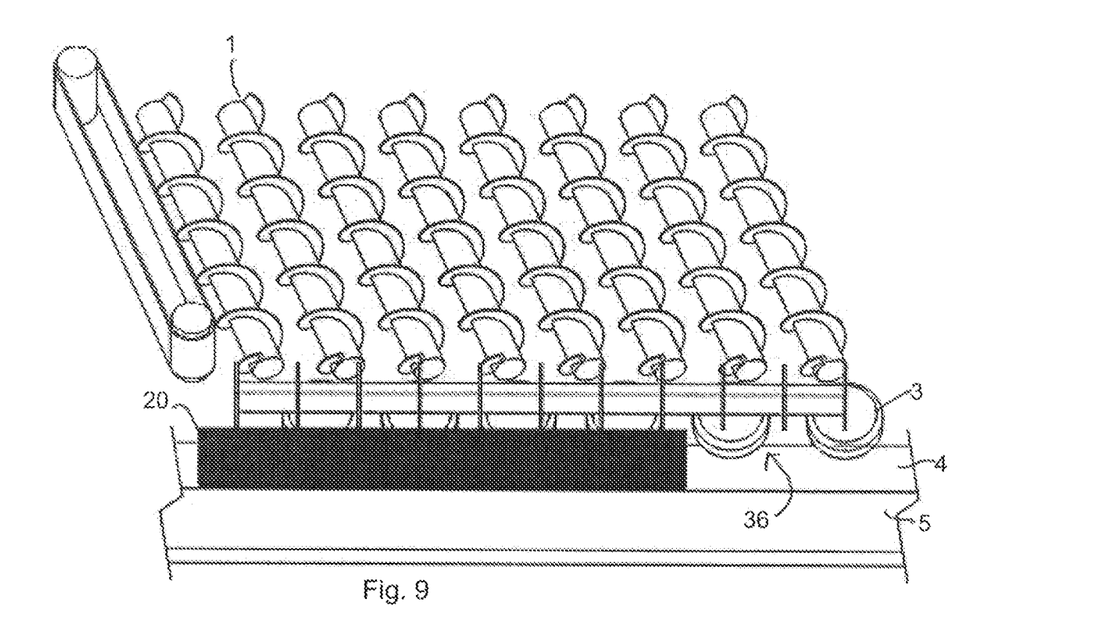
FIG. 9 illustrates a top view of the camfeeder system in which the high friction, eccentric disk kickers have rotated partially a first amount toward the extended position and the log has been pushed up the pocket slide in a transverse direction towards the conveyor and accelerated in a lineal direction the conveyor moves by the high friction surface of the disk kickers.
Figure 10:
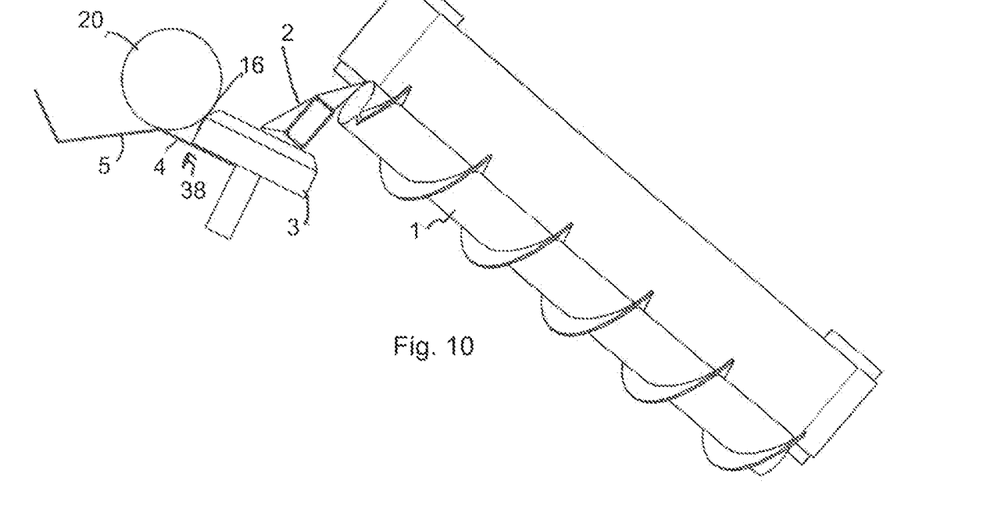
FIG. 10 illustrates a side view of the camfeeder system in which the high friction, eccentric disk kickers have rotated partially a second amount toward the extended position and the log has been pushed up the pocket slide in a transverse direction towards the conveyor and accelerated in a lineal direction the conveyor moves by the high friction surface of the disk kickers.
Figure 11:
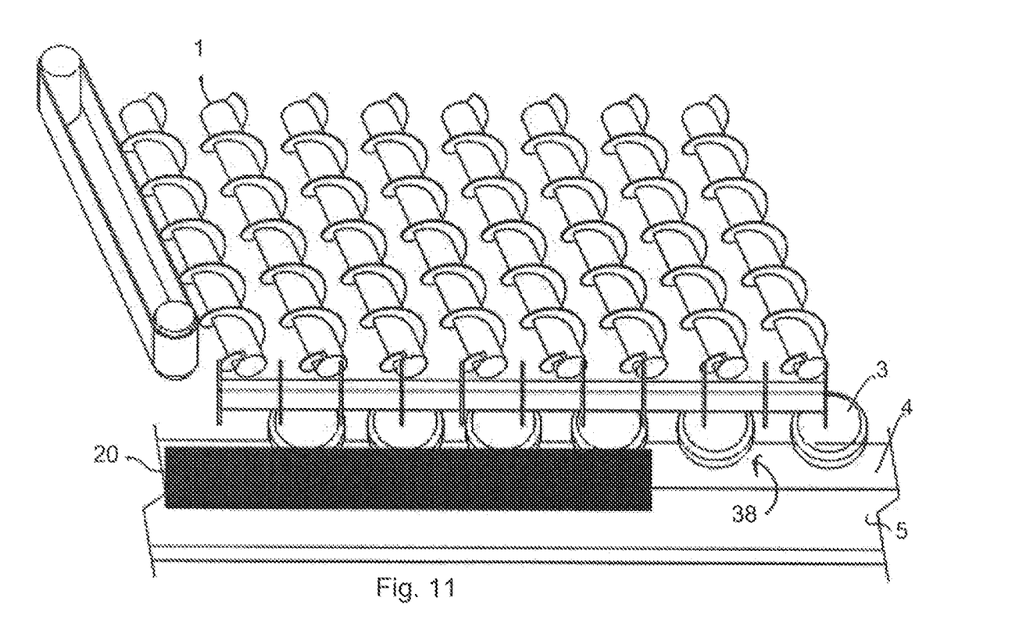
FIG. 11 illustrates a top view of the camfeeder system in which the high friction, eccentric disk kickers have rotated partially a second amount toward the extended position and the log has been pushed up the pocket slide in a transverse direction towards the conveyor and accelerated in a lineal direction the direction the conveyor moves by the high friction surface of the disk kickers.
Figure 12:
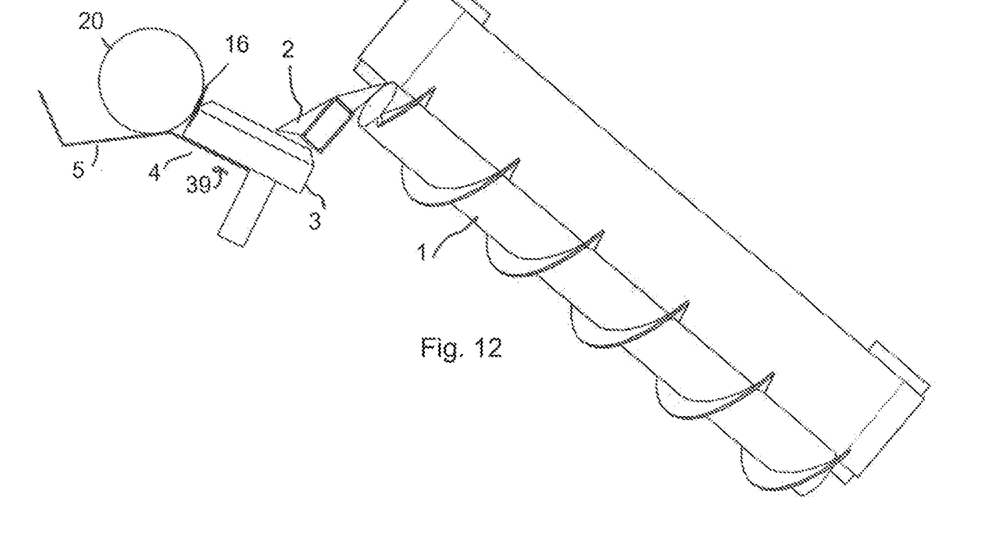
FIG. 12 illustrates a side view of the camfeeder system in which the high friction, eccentric disk kickers have rotated partially a third amount toward the extended position and the log has been pushed up the pocket slide in a transverse direction towards the conveyor and accelerated in a lineal direction the conveyor moves by the high friction surface of the disk kickers.
Figure 13:
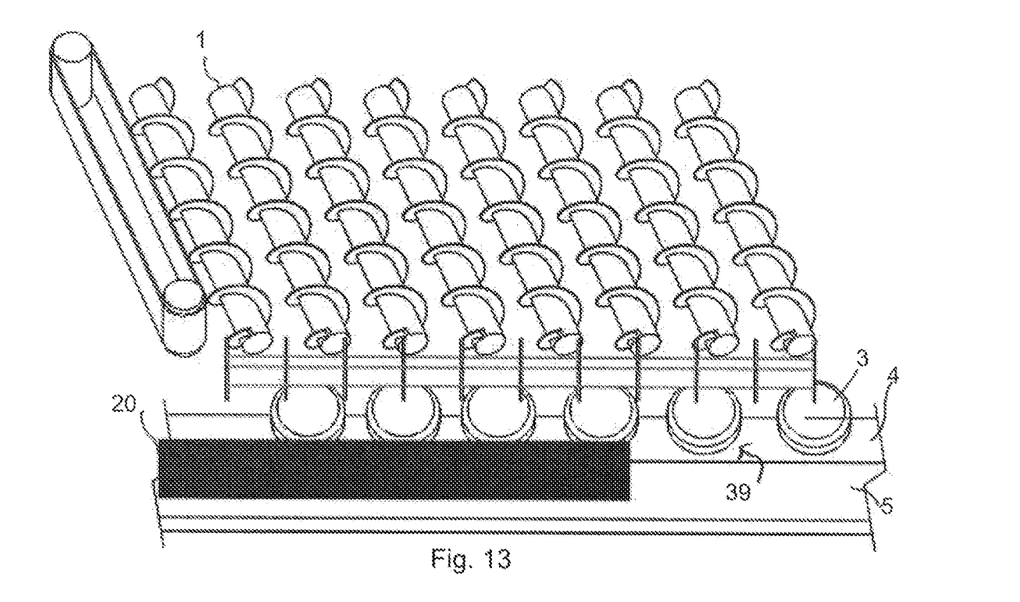
FIG. 13 illustrates a top view of the camfeeder system in which the high friction, eccentric disk kickers have rotated partially a third amount toward the extended position and the log has been pushed up the pocket slide in a transverse direction towards the conveyor and accelerated in a lineal direction the conveyor moves by the high friction surface of the disk kickers.
Figure 14:
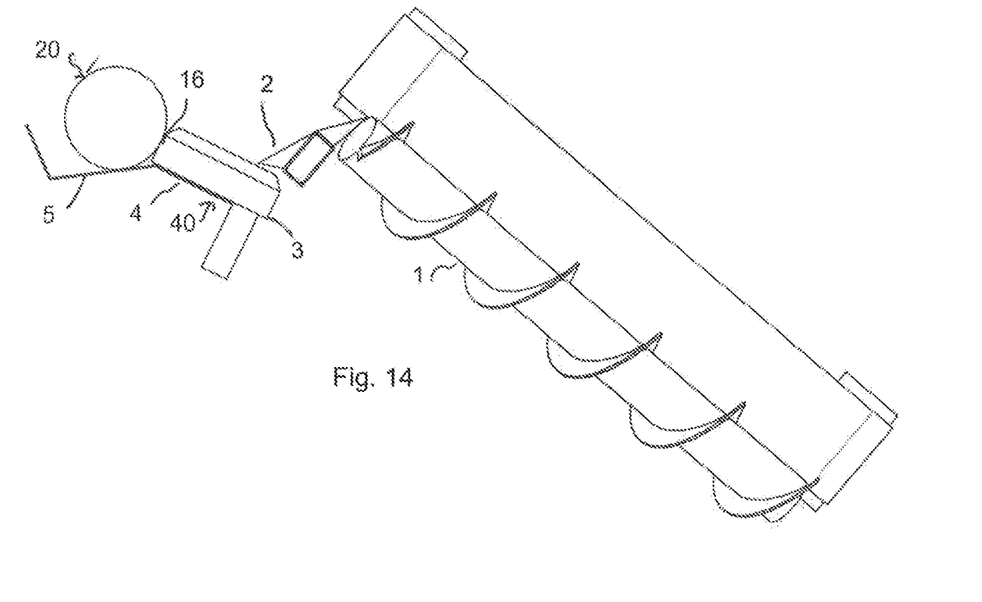
FIG. 14 illustrates a side view of the camfeeder system in which the high friction, eccentric disk kickers have rotated partially a fourth amount toward the extended position and the log has been pushed in a transverse direction onto the conveyor and accelerated in a lineal direction the conveyor moves by the high friction surface of the disk kickers.
Figure 15:
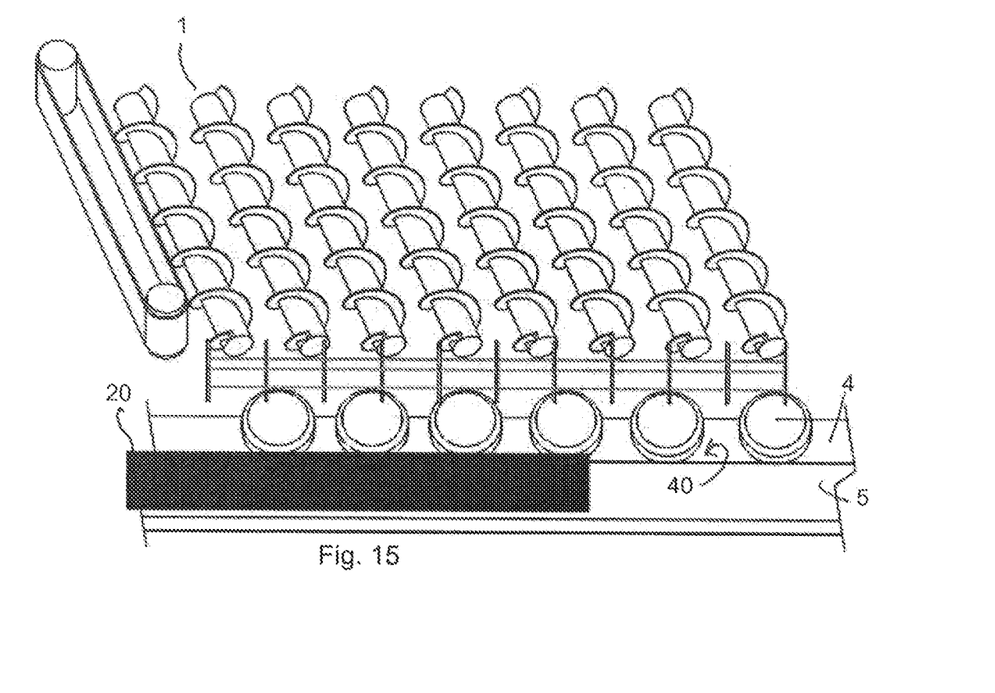
FIG. 15 illustrates a top view of the camfeeder system in which the high friction, eccentric disk kickers have rotated partially a fourth amount toward the extended position and the log has been pushed in a transverse direction onto the conveyor and accelerated in a lineal direction the conveyor moves by the high friction surface of the disk kickers.
Figure 16:
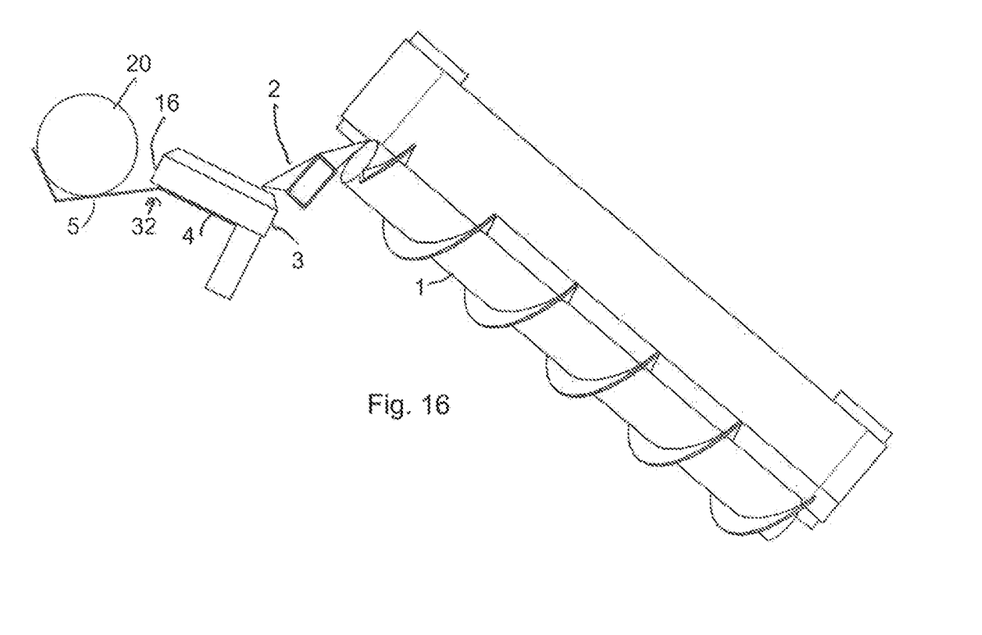
FIG. 16 illustrates a side view of the camfeeder system in which the high friction, eccentric disk kickers have rotated into the extended position and the log has been pushed in a transverse direction onto the conveyor and accelerated in a lineal direction the conveyor moves by the high friction surface of the disk kickers.

FIGS. 2-17 also illustrate the method of changing the direction a log 20 is being transported from a transverse 12 direction to a lineal direction 14. In FIGS. 2 and 3, the log 20 transported in transverse 12 direction has reached the end of the screws 1. In FIGS. 4 and 5, the log 20 has slid down the log slide 2 and is resting on top of the disk kickers 3 in their extended position 30. In FIGS. 6 and 7, the disk kickers 3 have rotated into a retracted position 34 and the log has dropped into the pocket 15 defined by the pocket slide 4 and the friction surface 16. In FIGS. 8 and 9, the disk kickers 3 have rotated to a partially extended first position 36 in which the log 20 is moved up the pocket slide 4 in a transverse 12 direction towards the conveyor 5 and is accelerated in the lineal 14 direction. In FIGS. 10 and 11, the disk kickers 3 have rotated to a partially extended second position 38 in which the log 20 is moved further up the pocket slide 4 in a transverse 12 direction towards the conveyor 5 and is further accelerated in the lineal 14 direction. In FIGS. 12 and 13, the disk kickers 3 have further rotated to a partially extended third position 39 in which the log 20 is moved further up the pocket slide 4 in a transverse 12 direction and onto the conveyor 5 and is further accelerated in the lineal 14 direction. In FIGS. 14 and 15, the disk kickers 3 have rotated to a partially extended fourth position 40 in which the log 20 is moved out of the pocket 15 in a transverse 12 direction onto the conveyor 5 and is further accelerated in the lineal 14 direction. In FIGS. 16 and 17, the disk kickers 3 have rotated to an extended position 32 and the log 20 is fully seated on the conveyor 5.

The conveyor 5 can be any type of conveyor, such as chains or belts that is suitable for conveying a heavy elongated object, such as a log.

While a plurality of screws 1 have been shown as an example for transporting a log 20 in a transverse direction 12, any suitable transport system for transporting a log 20 in a transverse direction 12 can be utilized.

The log slide 2 could be omitted or replaced with a different transition design depending on the design of the transverse feeder. Omitting the log slide 2 may be a performance improvement as it would likely reduce cycle time.

The quantity of disk kickers 3 may be increased or decreased based on the material properties of the species of log 20 being conveyed and/or the size and weight of the log 20. Typical log sizes are about 2 inches to about 42 inches in diameter, about 8 feet to about 60 feet in length, and about 150 pounds to about 3,500 pounds.

The pocket 15 could have any desired shape, such as v-shaped (pocket slide 4) or a scoop shape. However, the pocket 15 should be configured so that gravity biases the log 20 against the friction surface 16 so that when the disk kickers 3 are rotated force from the disk kickers 3 can be transferred from the friction surface 16 to the log 20 to both accelerate the log 20 in the lineal 14 direction and move the log in the transverse 12 direction.

The size of the disk kicker 3 can be any size as desired. In general, the larger the size the greater the log 20 will be accelerated in the lineal 14 direction. In general, the larger the size the greater the distance the log 20 will be moved in the transverse 12 direction. The size of the disk kicker 3 should be sufficient to move the log 20 from the pocket 15 onto the conveyor 5. Preferably, the disk kicker 3 should be sized and controlled so that the speed of the log 20 exiting contact with the friction surfaces 16 is close to the speed of the conveyer 5, and more preferably substantially matches the speed of the conveyor.

Figure 23:
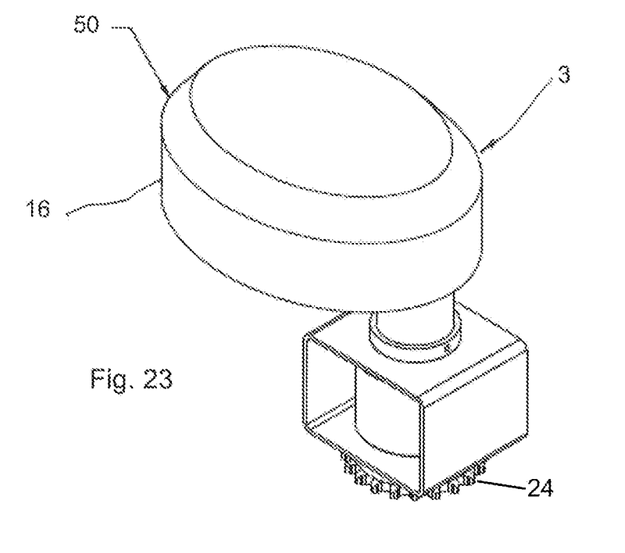
FIG. 23 illustrates a high friction, eccentric disk kicker having an elliptical profile.
Figure 24:
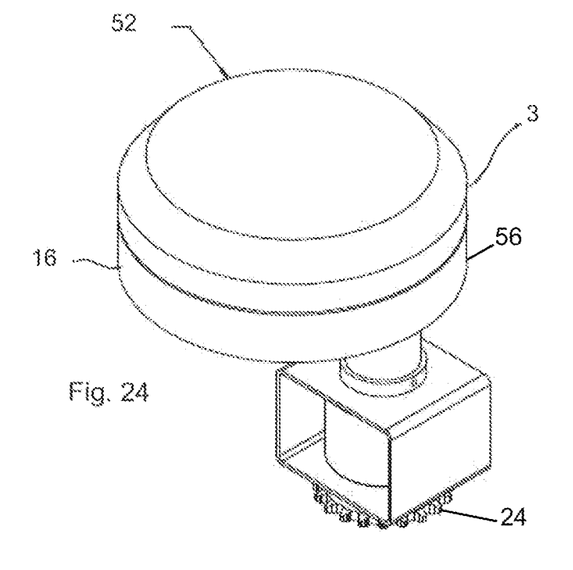
FIG. 24 illustrates a high friction, eccentric disk kicker having a top section that turns independently of the main body.
Figure 25:
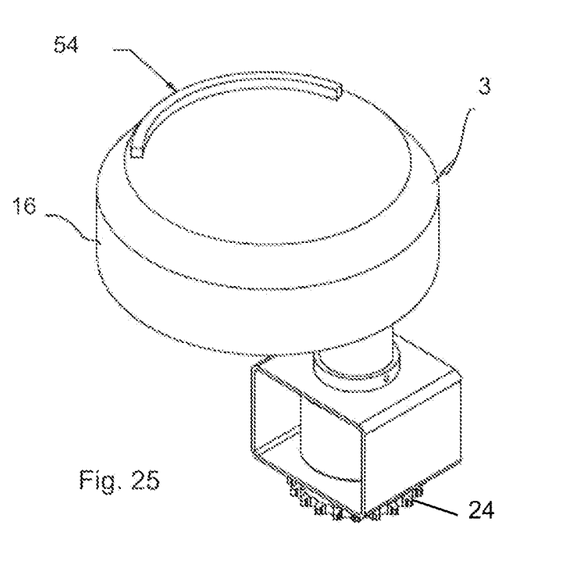
FIG. 25 illustrates a high friction, eccentric disk kicker having a stop lip.

Instead of a substantially round shape, the disk kicker 3 could have a more complex shape, such as an elliptical shape 50 as shown in FIG. 23 in order to provide more control over lineal versus transverse motion ratio. The disk kicker 3 could be split into two pieces a top section 52 having a separate drive that rotates independent of the main body 56, in order to have lineal motion independent or at a different proportion to the transverse motion, as shown in FIG. 24. A stop lip 54 could be added to the top of disk kicker 3 to prevent a log 20 from rolling off the disk kickers 3 prematurely, as shown in FIG. 25.

REFERENCE NOS

1 Transverse screw feeder
2 Log slide
3 High friction eccentric disk kicker
4 Pocket slide
5 Lineal outfeed conveyor
6 Proximity sensor
7 Encoder
8 PLC Controller
9 AC Motor
10 AC Drive
11 Machine vision camera
12 Transverse flow direction
13 Shaft
14 Lineal flow direction
15 Pocket
16 High friction surface
18 Conventional disk kicker
20 Log
22 Motor gear
24 Disk gear
26 Chain
28 Cloud
30 Top surface of disk
32 Extended position covering part of pocket slide 4
34 Retracted position exposing pocket slide 4
36 Partially extended a first amount
38 Partially extended a second amount
39 Partially extended a third amount
40 Partially extended a fourth amount
41 spikes
42 knurled
44 staggered teeth
46 rubber coating
48 projections
50 elliptical shape
52 top section turns independently
54 stop lip
56 main body
60 short axis
62 long axis It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A camfeeder system for changing a direction an elongated object is being transported from a transverse direction to a lineal direction comprising:
a conveyor configured for conveying the elongated object in the lineal direction, the elongated object having a short axis and a long axis, the long axis being aligned with the lineal direction and the short axis being aligned with the transverse direction; and
a disk kicker being configured to rotate about an off-center shaft, the disk kicker having a friction surface configured to contact a surface of the elongated object, and during rotation the disk kicker simultaneously accelerates the elongated object in the lineal direction the conveyor moves and moves the elongated object in the transverse direction onto the conveyor.

2. The camfeeder system according to claim 1, further comprising a plurality of rotatable, elongated screws parallel to each other and being configured for conveying the elongated object resting on the rotatable, elongated screws in the transverse direction from a first end of the rotatable elongated screws to a second end of the rotatable, elongated screws by rotating the elongated screws, and the conveyor is disposed at the second end of the rotatable, elongated screws.

3. The camfeeder system according to claim 1, further comprising a plurality of disk kickers, each disk kicker having an associated friction surface and being mounted on an associated off-center on a shaft.

4. The camfeeder according to claim 1, wherein the elongated object is a log.

5. The camfeeder system according to claim 1, wherein the friction surface comprises at least one of a spiked surface, a knurled surface, staggered teeth, projections, or a rubber surface.

6. The camfeeder system according to claim 1, wherein the disk kicker has a circular shape.

7. The camfeeder system according to claim 1, wherein the disk kicker has an elliptical shape.

8. The camfeeder system according to claim 1, wherein the disk kicker comprises a main body and a top section that is rotatable independent of the main body.

9. The camfeeder system according to claim 1, wherein a top surface of the disk kicker has a stop lip.

10. A method of changing a direction an elongated object is travelling from a transverse direction to a lineal direction comprising:
moving the elongated object in a transverse direction to a pocket, the elongated object having a short axis and a long axis, the long axis being aligned with the lineal direction and the short axis being aligned with the transverse direction, and the pocket being configured so that gravity biases a surface of the elongated object against a friction surface of a disk kicker;
depositing the elongated object in the pocket so that a surface of the elongated object is biased against the friction surface;
rotating the disk kicker so that the friction surface contacts the surface of the elongated object to simultaneously accelerate the elongated object in the lineal direction and move the elongated object in the transverse direction onto a conveyor, and the disk kicker being mounted on an associated off-center shaft; and
conveying the elongated object in the lineal direction on the conveyor.

11. The method according to claim 10, further comprising placing the elongated object onto a plurality of rotatable, elongated screws parallel to each other, and rotating the elongated screws to move the elongated object in transverse direction from a first end of the rotatable elongated screws to a second end of the rotatable, elongated screws, and wherein the pocket being located at the second end.

12. The method according to claim 10, further comprising a plurality of disk kickers, each disk kicker having an associated friction surface and being mounted on an associated off-center on a shaft.

13. The method according to claim 10, wherein the friction surface comprises at least one of a spiked surface, a knurled surface, staggered teeth, projections, or a rubber surface.

14. The method according to claim 10, wherein the disk kicker has a circular shape.

15. The method according to claim 10, wherein the disk kicker has an elliptical shape.

16. The method according to claim 10, wherein the disk kicker comprises a main body and a top section that is rotatable independent of the main body.

17. The method according to claim 10, further comprising moving the elongated object in the transverse direction until the elongated object is deposited on top of the disk kicker in an extended position, and rotating the disk kicker to a retracted position and the elongated object dropping into the pocket where the surface of the elongated object is biased against the friction surface.

18. The method according to claim 17, wherein a top surface of the disk kicker has a stop lip, and the method further comprising stopping the elongated object from prematurely rolling off of the top of a disk kicker by the stop lip.

19. A method of changing a direction a log is travelling from a transverse direction to a lineal direction comprising:
moving the log in a transverse direction to a pocket, the log having a short axis and a long axis, the long axis being aligned with the lineal direction and the short axis being aligned with the transverse direction, and the pocket being configured so that gravity biases a surface of the log against a friction surface of a disk kicker;
depositing the log in the pocket so that a surface of the log is biased against the friction surface;
rotating the disk kicker so that the friction surface contacts the surface of the log to simultaneously accelerate the log in the lineal direction and move the log in the transverse direction onto a conveyor, and the disk kicker being mounted on an associated off-center shaft; and
conveying the log in the lineal direction on the conveyor.

20. The method according to claim 19, further comprising placing the log onto a plurality of rotatable, elongated screws parallel to each other, and rotating the elongated screws to move the log in transverse direction from a first end of the rotatable elongated screws to a second end of the rotatable, elongated screws, and wherein the pocket being located at the second end.

21. The method according to claim 19, further comprising a plurality of disk kickers, each disk kicker having an associated friction surface and being mounted on an associated off-center on a shaft.

22. The method according to claim 19, wherein the friction surface comprises at least one of a spiked surface, a knurled surface, staggered teeth, projections, or a rubber surface.

23. The method according to claim 19, wherein the disk kicker has a circular shape.

24. The method according to claim 19, wherein the disk kicker has an elliptical shape.

25. The method according to claim 19, wherein the disk kicker comprises a main body and a top section that is rotatable independent of the main body.

26. The method according to claim 19, further comprising moving the log in the transverse direction until the log is deposited on top of the disk kicker in an extended position, and rotating the disk kicker to a retracted position and the log dropping into the pocket where the surface of the log is biased against the friction surface.

27. The method according to claim 26, wherein a top surface of the disk kicker has a stop lip, and the method further comprising stopping the log from prematurely rolling off of the top of a disk kicker by the stop lip.

* * * * *